G. A. STOFFEL.
DISH DRYING RACK.
APPLICATION FILED MAY 7, 1920.

1,406,773.  Patented Feb. 14, 1922.
2 SHEETS—SHEET 1.

George A. Stoffel
INVENTOR

BY Victor J. Evans
ATTORNEY

WITNESS:
E. A. Buchanan.
J. M. Jester

G. A. STOFFEL.
DISH DRYING RACK.
APPLICATION FILED MAY 7, 1920.
1,406,773.
Patented Feb. 14, 1922.
2 SHEETS—SHEET 2.
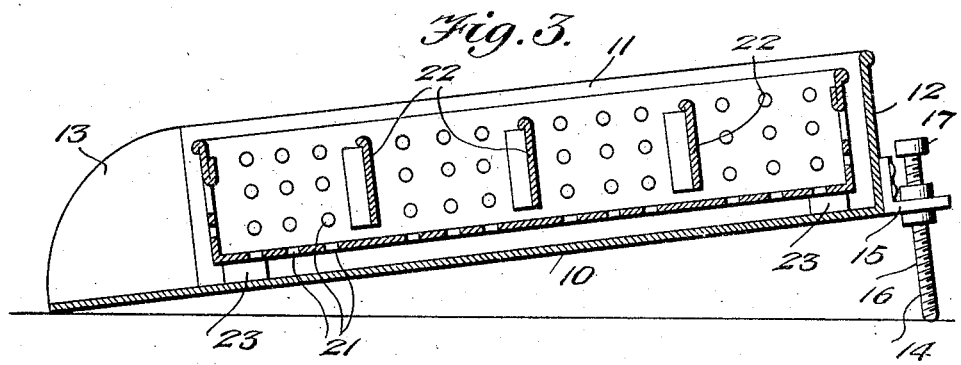
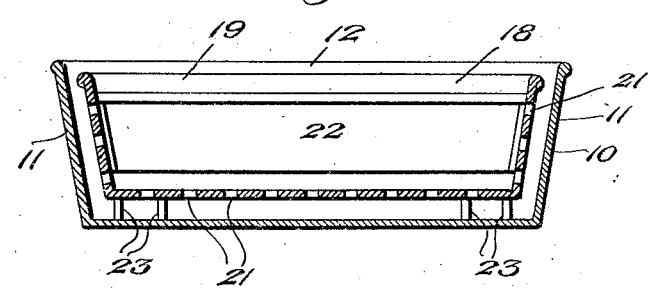
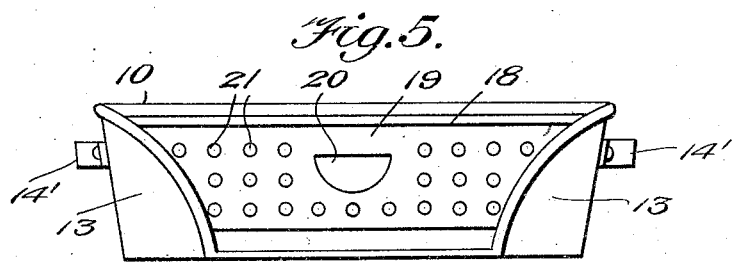
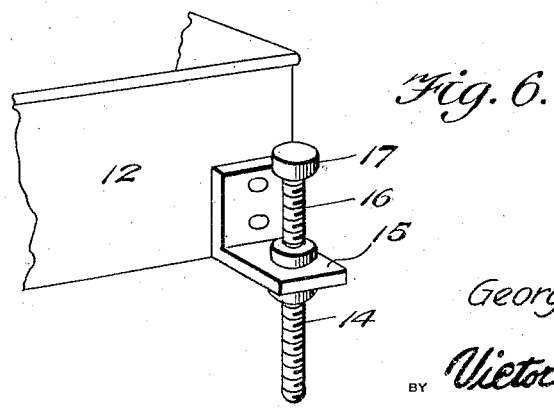
George A. Stoffel
INVENTOR
BY Victor J. Evans
ATTORNEY
WITNESS:
E. A. Buchanan.
J. M. Jester

UNITED STATES PATENT OFFICE.

GEORGE A. STOFFEL, OF HUNTINGTON, INDIANA.

DISH-DRYING RACK.

1,406,773.  Specification of Letters Patent.  Patented Feb. 14, 1922.

Application filed May 7, 1920. Serial No. 379,628.

*To all whom it may concern:*

Be it known that I, GEORGE A. STOFFEL, a citizen of the United States, residing at Huntington, in the county of Huntington and State of Indiana, have invented new and useful Improvements in Dish-Drying Racks, of which the following is a specification.

This invention relates to kitchen devices, particularly to dish racks and the like, and has for its object the provision of a device adapted to be disposed upon a drain-board with one end extending over the kitchen sink, the device being formed as a rack for holding dishes after they are washed so that they may drain and become dry from evaporation.

An important and more specific object is the provision of a device of this character which includes an outer pan supported in an adjustable inclined position on the drain board and one or more inner pans each formed as a rack, perforated throughout to permit water to flow therefrom into the outer pan and supported upon legs within the outer pan so that all the water draining from the dishes placed in the rack or racks, may pass out of the inner pan into the outer pan and thence into the sink.

An additional object is the provision of a device of this character which will be simple and inexpensive in manufacture, efficient and labor saving in use, and a general improvement in the art.

Figure 1:
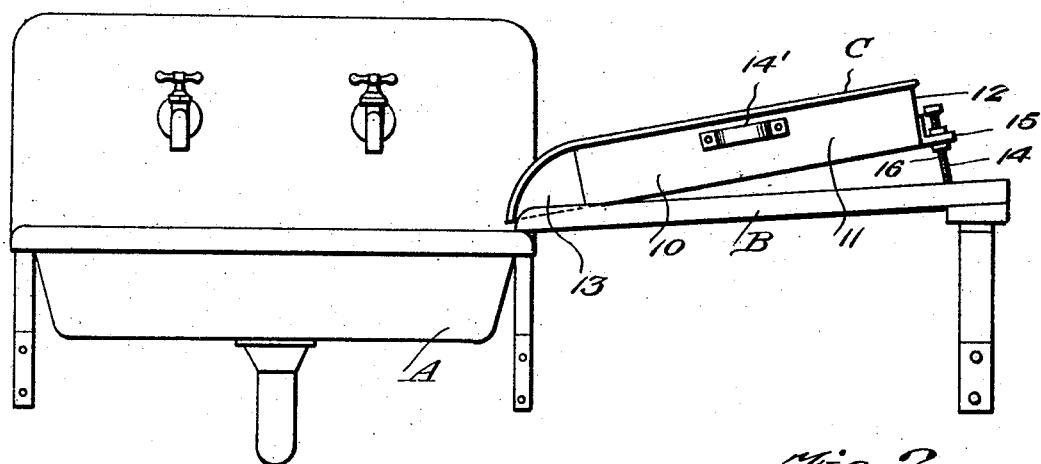
Figure 2:
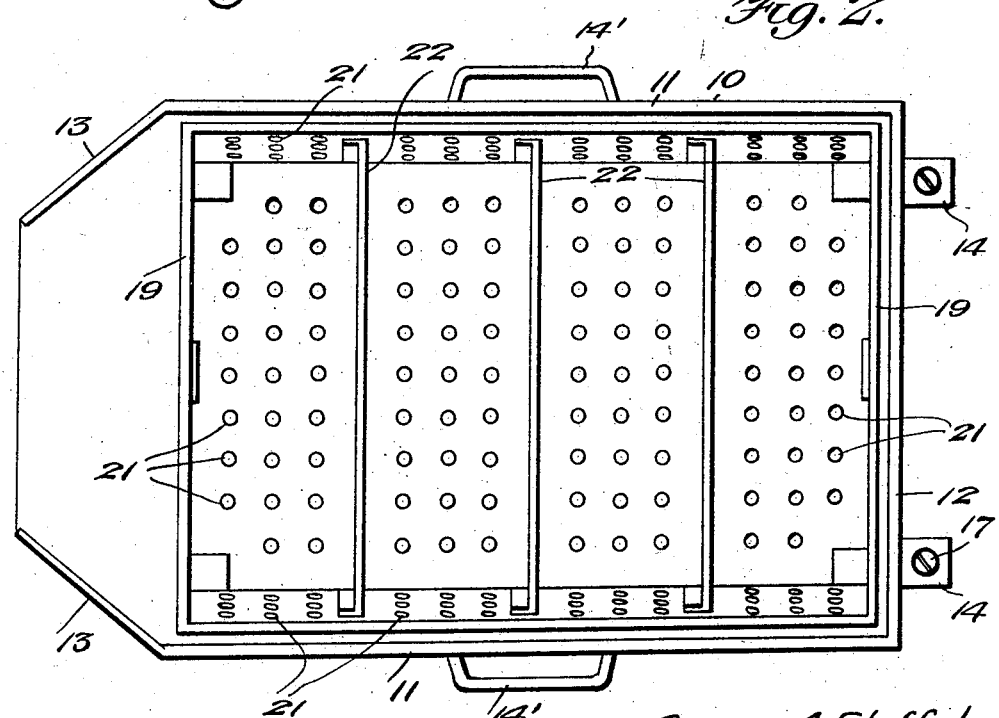

With the above and other objects and advantages in view, the invention consists in the details of construction to be hereinafter more fully described and claimed, and illustrated in the accompanying drawings in which Figure 1 is an elevation of a kitchen sink and drain-board, showing my device in position, Figure 2 is a plan view of my device, Figure 3 is a longitudinal sectional view, Figure 4 is a cross sectional view, Figure 5 is an end elevation looking at the discharge end of the outer pan, and Figure 6 is a detail view of the adjusting legs.

Referring more particularly to the drawings, the letter A designates a kitchen sink, B designates the drain-board associated therewith, and C designates my device.

Referring more particularly to the drawings, I have shown my device as comprising an outer pan 10 which is rectangular in shape with inclined side walls 11 and an end wall 12. The other end of this pan is open and the sides converge toward this open end, as shown at 13, so that this open end will have the nature of a discharge chute. At its closed end the pan carries supporting means 14 so that when it is disposed upon the drain-board B it will be inclined with the open discharge end lowermost and the device is so positioned that this discharge end will extend beyond the drain-board over the sink. If desired, the outer pan 10 may be provided with any suitable handles 14.

It is preferable that the supporting means 14 be adjustable so that the device may be properly positioned upon drain-boards of different inclinations and in actual practice this supporting means includes right angular lugs 15 secured upon the rear corners of the pan and having extending therethrough screws 16 having heads 17 by means of which the screws may be adjusted.

Disposed within the outer pan 10 is the inner pan 18 which is of slightly smaller dimensions than the outer pan so as to be spaced from the side and closed ends thereof. The end walls 19 of this inner pan are formed with openings 20 constituting hand holds so that it may be lifted conveniently. The sides, ends, and bottom of this inner pan are perforated, as shown at 21, and these perforations may be of any desired number and size. Disposed within the inner pan 18 are transverse partitions 22 which might be slidably mounted but which are here shown as secured to the sides. All of these partitions terminate above the bottom of the inner pan, as clearly shown, and constitute a rack structure for supporting dishes of all kinds placed within the inner pan.

At its corners, the bottom of the inner pan is cut and stamped to form downwardly extending lugs 23 which rest upon the bottom of the outer pan and which serve as feet for holding the inner pan in spaced relation to the bottom of the outer pan.

In the use of the device, dishes, after being washed, are placed within the inner rack and are supported in substantially upright positions by the partitions 22. The water on the dishes will drain therefrom and will pass through the perforations in the inner pan and fall into the outer pan, from whence it will discharge through the open end thereof into the sink. The device is particularly useful for scalding dishes, in which event the dishes, after being washed in the ordinary manner, are placed in the rack, whereupon scalding water is poured over them. The water will of course drain from the dishes and pass from the pans, and in a reasonably short time the dishes will dry by evaporation.

While I have shown and described the device as comprising the outer pan with a single inner pan disposed therein, it will be readily apparent that when the device is intended for use in restaurants, hotels, or other places where a large number of dishes must be handled, it is preferable to use a very large outer pan within which would be disposed a plurality of inner pans which would be identical in construction. The reason for this is of course that the inner pans could be more readily handled than if only one very large pan were used.

From the foregoing description and a study of the drawings it will be apparent that I have thus provided a very simply constructed and highly useful device for saving time and labor in the drying of dishes, the device being efficient in use and sanitary in service.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:

A device of the character described comprising an outer imperforate receptacle adapted for disposition upon the drain board of a sink and having its top open, and one end open and formed with converging side flanges defining a discharge chute adapted to lead into the sink, an inner receptatcle open at its top and provided with perforations thoughout, spacing means carried by the under side of said inner receptacle engaging upon the bottom of said outer receptacle, the inner receptacle having all of its walls arranged in spaced relation to the walls of the outer receptacle, a plurality of substantially vertically extending partitions extending across the inner receptacle and secured thereto and terminating in spaced relation to the bottom thereof, brackets secured at the rear corners of the outer receptacle, and screw members passing through said brackets and adjustable whereby to vary the height of the rear end of the outer receptacle.

In testimony whereof I affix my signature.

GEORGE A. STOFFEL.